United States Patent [19]

Shatto et al.

[11] Patent Number: 4,682,913
[45] Date of Patent: Jul. 28, 1987

[54] HYDRAULIC STAB CONNECTOR

[75] Inventors: Howard L. Shatto; Theodore L. Agon, both of Houston, Tex.

[73] Assignee: Shell Offshore Inc., Houston, Tex.

[21] Appl. No.: 901,915

[22] Filed: Aug. 28, 1986

[51] Int. Cl.⁴ .............................................. F16L 1/04
[52] U.S. Cl. .................................... 405/169; 166/344; 285/27; 405/191
[58] Field of Search ............................ 405/169–171, 405/190, 191, 195; 166/338, 342, 343; 285/27

[56] References Cited

U.S. PATENT DOCUMENTS

| | | | |
|---|---|---|---|
| 3,052,299 | 4/1962 | Geer et al. | 166/347 |
| 3,166,123 | 1/1965 | Watkins | 405/191 X |
| 3,345,085 | 10/1967 | Hanes | 285/27 |
| 3,482,410 | 12/1969 | Roesky et al. | 405/171 X |
| 3,899,199 | 8/1975 | Garey | 285/27 |
| 3,967,462 | 7/1976 | DeJong | 405/169 |
| 4,046,192 | 9/1977 | Darnborough et al. | 166/344 X |
| 4,109,601 | 8/1978 | Ronnevig | 405/190 |
| 4,386,659 | 6/1983 | Shotbolt | 166/344 X |
| 4,490,073 | 12/1984 | Lawson | 166/344 X |
| 4,533,162 | 8/1985 | Rundell | 285/27 |
| 4,601,608 | 7/1986 | Ahlstone | 405/169 |

Primary Examiner—Dennis L. Taylor

[57] ABSTRACT

An apparatus and method for connecting a fluid conduit carried by an ROV to a fluid conduit of a subsea equipment assembly, such as a hydraulically-actuated device, in a non-binding manner. The apparatus includes a vacuum-locking device, such as a hydraulically-actuatable suction lock assembly, which is selectively actuatable to lock or unlock the apparatus with respect to the device of the assembly.

6 Claims, 6 Drawing Figures

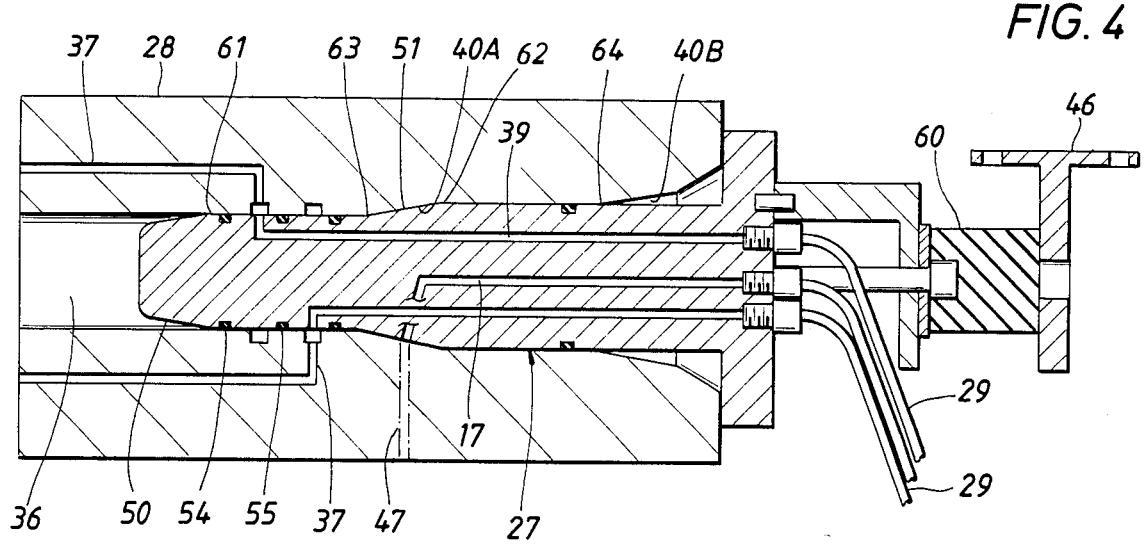
FIG. 4
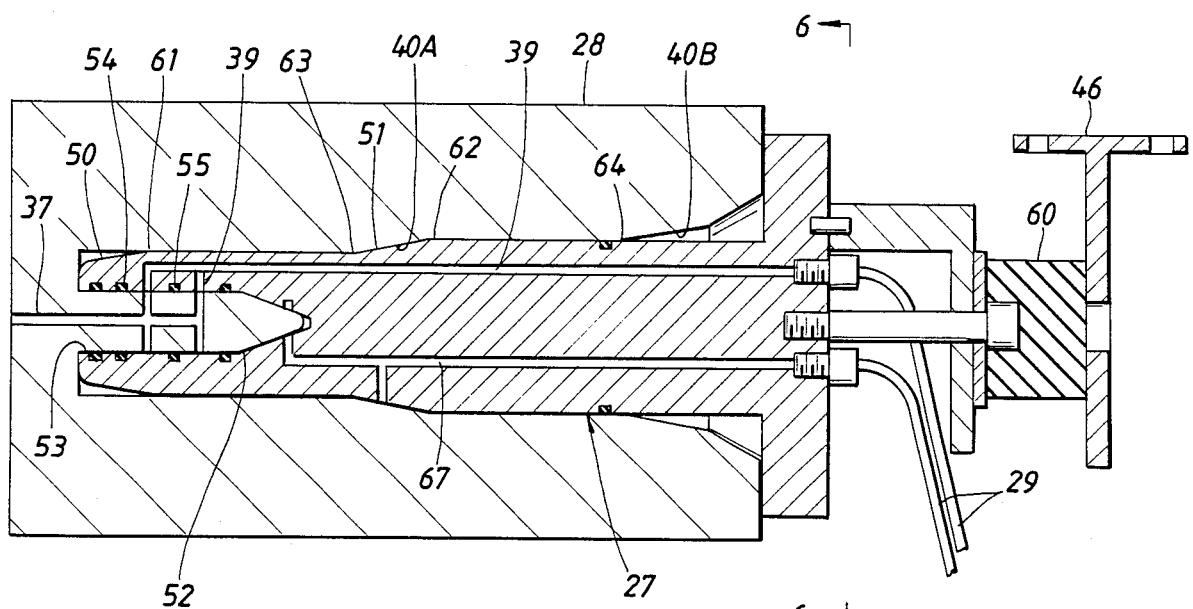
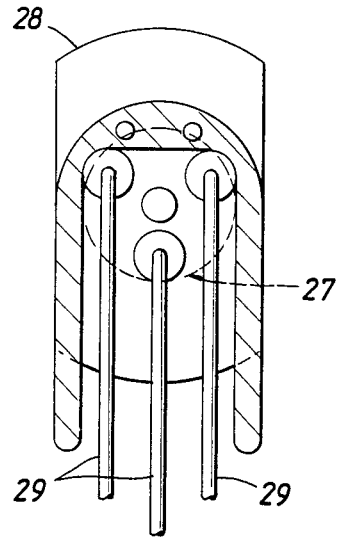
FIG. 5
FIG. 6

HYDRAULIC STAB CONNECTOR

FIELD OF THE INVENTION

The present invention relates to an apparatus and method for use in connecting a fluid conduit carried by a R.0.V. to a fluid conduit of a subsea equipment assembly, such as a hydraulically-actuated device, in a non-binding manner.

BACKGROUND OF THE INVENTION

As offshore drilling operations progress into deeper waters, usually greater than 1000 feet, dynamically-positioned drilling vessels are used to drill a deep water well. The vessel is usually positioned above a subsea wellhead located on the ocean floor and a pipe assembly, commonly called a riser, is extended downwardly from the vessel to the subsea wellhead.

The lower end of the riser usually contains hydraulically-actuated well control valves and equipment coupling devices used to connect the lower end of the riser to the subsea wellhead. Pressurized hydraulic fluid supplied from the drilling vessel via hydraulic cables is used to actuate these hydraulic devices.

At times, the hydraulic cables become damaged during drilling operations, thereby severing the source of pressurized hydraulic fluid that is supplied to the hydraulically-actuated devices. At other times subsurface electric power or control circuit or component failure can render normal direct wire control of blow out preventer functions inoperable.

Without assistance of divers or remotely operated vehicles (R.0.V.'s), the entire riser assembly would have to be retrieved to the surface to repair the hydraulic or electric system failure, an operation that would require the retrieval of thousands of feet of riser pipe at a cost of up to a million dollars.

Since divers cannot be safely used to repair subsea equipment which is located at depths which may approach 7,000 feet, the task of repairing the hydraulic or electric system failure would depend on a R.0.V., if the R.0.V. is capable of performing the system repair operation.

Repair of such subsea hydraulic or electric circuits underwater is usually not feasible because of requirements for detailed disassembly and use of diagnostic instruments. The equipment must usually be brought to the surface for repair.

In the event of such failures, it is sometimes necessary to provide emergency operation of some blow out preventer (B.0.P.) functions to close in the well so that the control packages on the Lower Marine Riser Package can be recovered to the surface safely or to disconnect the main B.0.P. stack connector from the wellhead to recover the whole stack.

In the past, emergency hydraulic connections were made to connect an emergency pump on the R.0.V. system to the B.0.P. function using snap sleeve connectors designed for quick connection of hydraulic lines by human hands. These have been found to be easily damaged and difficult to stab when used by a more powerful but clumsy R.0.V.

Applicant is not aware of any prior art which, in his judgment as one skilled in this particular art, would anticipate or render obvious the present invention. However, for the purpose of fully developing the background of the invention and establishing the state of the requisite art, the following art is set forth: U.S. Pat. Nos. 3,846,922;, 3,482,410; 4,533,162; 3,052,299; 3,967,462; 3,899,199; 3,345,085; and 4,601,608.

SUMMARY OF THE INVENTION

The present invention is directed to an apparatus and method for use in connecting a fluid conduit carried by a R.0.V. to a fluid conduit of a subsea equipment assembly, such as a hydraulically-actuated device, in a non-binding manner.

In a preferred embodiment of the present invention, a probe apparatus carried at one end of an auxiliary hydraulic supply line is positioned within a receptacle mounted near a hydraulically-actuated element which may be on the riser, subsea blowout preventer stack, or xmas tree. The receptacle forms a chamber in the form of a probe socket having aligning means for assisting in positioning the probe within the receptacle.

Cooperating hydraulic connection elements carried by the apparatus and the receptacle, when engaged, form a pressure-tight seal and allow pressurized hydraulic fluid to flow from the apparatus, or other suitable source, through the receptacle to the hydraulically-actuated devices which form a portion of the riser or subsea B.0.P. stack or an underwater xmas tree.

An object of the present invention is to provide an apparatus and method of connecting an auxiliary pressurized hydraulic fluid supply to the hydraulically-actuated devices which form a portion of the subsea blowout preventer stack, xmas tree, or riser assembly. The invention ensures coaxial alignment of the apparatus with the receptacles carried by these devices prior to insertion of the apparatus since the apparatus and the receptacles have very tight tolerances.

It is a further object of the present invention to provide an apparatus capable of pressure-tight engagement with the receptacle carried by a portion of the subsea blowout preventer stack, xmas tree, or riser assembly.

The various features of novelty which characterize the present invention are pointed out with particularity in the claims forming a part of this disclosure. For a better understanding of the invention, its operating advantages and specific objects obtained by its uses, reference should be made to the accompanying drawings and descriptive matter in which there are illustrated preferred embodiments of the invention.

BRIEF DESCRIPTION OF THE DRAWINGS

FIGS. 2,3, and 4 are schematic representations of the apparatus being positioned within the receptacle.

FIG. 5 is another preferred embodiment of the present invention.

FIG. 6 is a view taken along line 6—6 of FIG. 5.

DESCRIPTION OF THE PREFERRED EMBODIMENT

Figure 1:
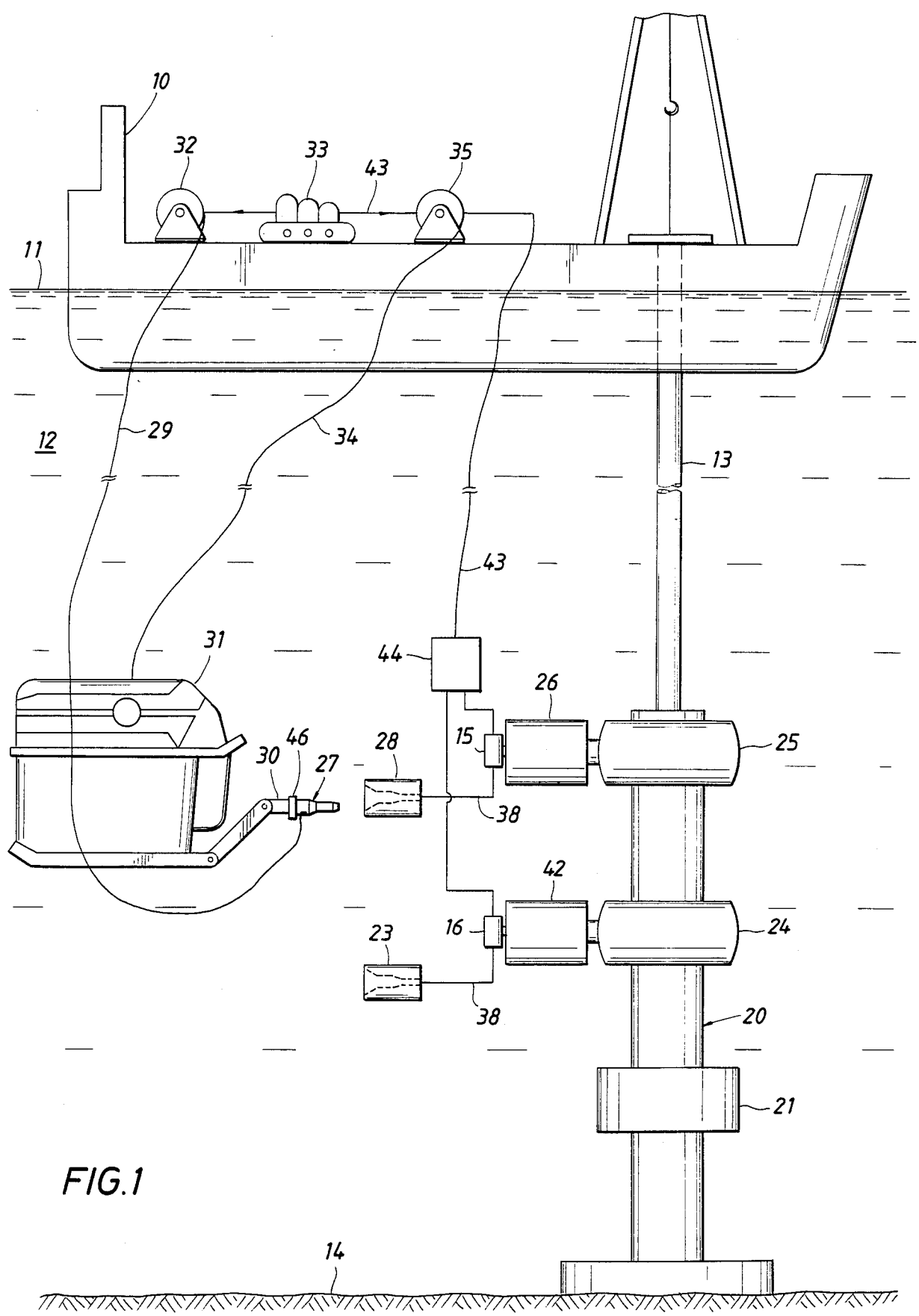
FIG. 1 is a schematic representation of an underwater vehicle positioned adjacent a subsea equipment assembly.

Referring to FIG. 1, a vessel 10 is shown floating upon the surface 11 of the body of water 12. A riser assembly 13 extends downwardly from the vessel 10 towards the bottom 14 of the body of water 12. The lower elements of the riser assembly 13 consist, in this example, of a subsea wellhead assembly 20 typically positioned on the bottom 14 of the body of water 12 and extending downwardly into the earth formation for drilling and completion operations.

It is recognized that the term subsea wellhead assembly 20 is meant to include any assemblage of components either fixedly or removably secured to the top of one or more strings of pipe extending into the ocean floor 14, either during the drilling, completion, production, reworking, or maintenance of a well. Thus, during the drilling of a well, the subsea wellhead assembly 20 may comprise certain components such as B.O.P.'s, valves, connectors, etc.

Furthermore, the apparatus and method of the present invention can be used on other equipment submerged in a body of water 12 such as for chemical corrosion inhibitor injection. However, for purposes of the present discussion, the subsea wellhead assembly 20 comprises various components such as hydraulically-actuated valves 24 and 25 which are actuated by valve actuators 42 and 26, respectively. These actuators are normally controlled through shuttle valves 16 and 15 using a surface pressure source means 33 via line 43 to a control pod 44 in a manner well known to the art. Alternatively, in the event of a hydraulic or electrical failure in pod 44 or a break in line 43, an auxiliary pressure source could be provided employing the present invention as described below.

A probe apparatus 27 for supplying auxiliary pressurized fluid to a subsea equipment assembly 20, is shown in FIG. 1 as being carried by an R.O.V. 31. The probe 27 is carried by or gripped, preferably in a removable manner, at one end by a manipulator arm 30 carried by an underwater vehicle 31. The holding means 46 carried by the probe 27 preferably includes at least a portion 60 (FIG. 2) made of flexible material, such as rubber, to facilitate inserting the probe 27 into the receptacle 28 by providing flexibility between the probe 27 and the arm 30. Lateral flexibility may be useful to allow the turning couple of the dual tapers of the probe 27 to steer probe 27 into co-axial alignment with the receptacle 28.

The probe 27 (FIG. 1) is shown near the hydraulic valve actuator 26 which has a receptacle 28 for receiving the probe 27.

The probe 27 is in fluid communication with conduit means 29, such as a hydraulic cable, conduit or hose. In a preferred embodiment, the conduit 29 supplies pressurized hydraulic fluid from a fluid source means 33 on the vessel 10 via a winch 32 to the probe 27 in a manner well know to the art.

The underwater vehicle 31 may be powered by a power and signal transmission cable 34 which has been reeled off of the surface vessel's 10 winch 35. The underwater vehicle 31 may be remotely operated from the vessel 10 by observation of TV signals received from cameras (not shown) carried by the underwater vehicle 31. Alternatively, a diver (not shown) may also be used to position the probe apparatus 27 into the receptacle 28 in shallow water depths.

It is recognized that the fluid source means 33 may be carried by the underwater vehicle 31, instead of the surface vessel 10, thereby reducing the possibility that the cables 29, 34 may become entangled with the underwater vehicle 31.

Figure 2:
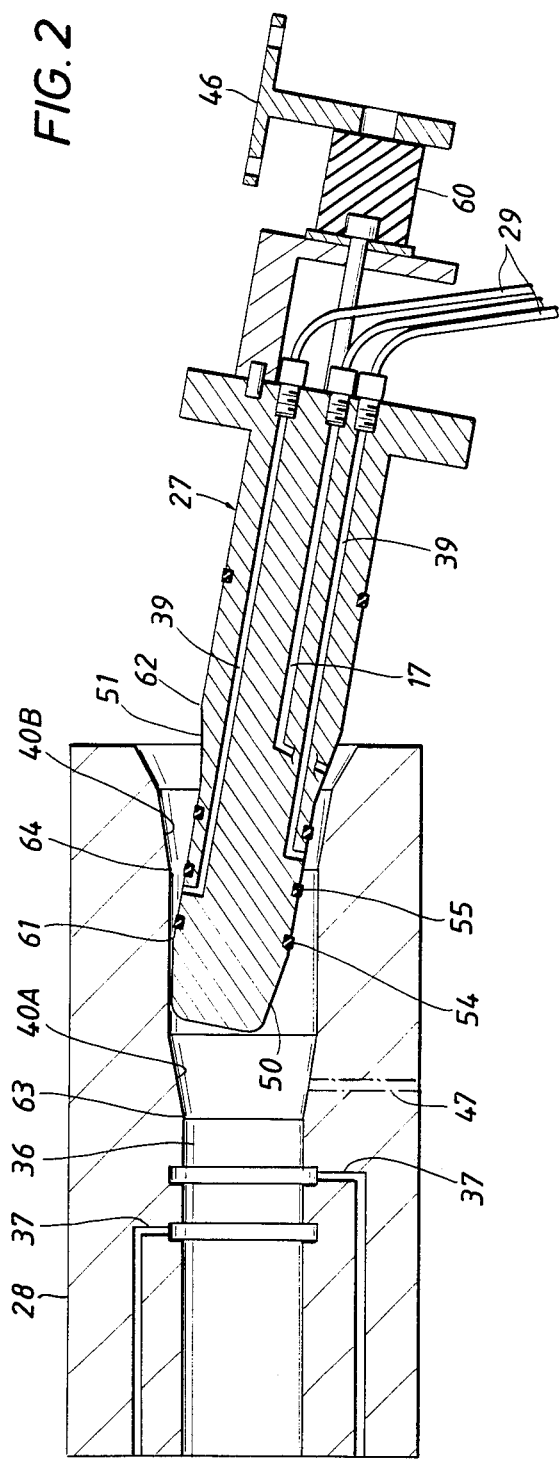

Referring to FIG. 2, the probe 27 has a first tapered shoulder 50 at the end of the probe 27 entering the receptacle 28 first. A second tapered shoulder 51 is axially displaced from the first shoulder 50 at a selected distance to generate a desired turning couple to force co-axial alignment of the probe 27 with the receptacle 28. The slope of the two tapered shoulders 50, 51 and the distance between those shoulders can be selected to generate the desired alignment couple to steer the probe into co-axial alignment. The diameter of the probe 27 is enlarged at the trailing end of the top of the second shoulder 51 namely at point 62.

The receptacle 28 has an open end and a chamber 36 defined therein. The chamber 36 of the receptacle 28 has means for aligning the probe 27 into the receptacle so that the longitudinal axis of the throughbore of the receptacle 28 is aligned parallel to the longitudinal axis of the probe 27 in their operative position (FIG. 4). The aligning means of the receptacle 28 consists of two portions 40A and 40B which cooperate to provide a turning couple that forces co-axial alignment as described above. The first portion 40A causing coaxial alignment of the probe body 27 upon insertion into the receptacle 28. Simultaneously the second portion 40B at the entry-end of the receptacle 28 serves to align the probe 27 upon initial entry into the receptacle's chamber 36 as shown in FIG. 2.

The first shoulder 50 and second shoulder 51 of the probe 27 are spaced at a selected distance to ensure that the two cylinders of probe begin the insertion of their tight fit at the same point during the insertion of the probe 27 once coaxial alignment has been achieved. The distance from the trailing end of the first tapered shoulder 50, shown as 61 in FIG. 2, to the trailing end of the 2nd shoulder 51, shown as 62 in FIG. 2, must be substantially equal to the distance from the leading end of the first portion 40A of the receptacle 28, shown as 63, to the leading end of the 2nd portion 40B of the receptacle 28, shown as 64.

In a preferred embodiment, the probe 27 incorporates hydraulic fluid conduit means 39 in the form of one or more fluid flow passages which are in fluid communication with corresponding fluid conduit means 37 of the receptacle 28 which form circumferential fluid flow passages when the probe 27 is in an operative or seated position (FIG. 4).

Furthermore, the receptacles 28 and 23 (FIG. 1) incorporate hydraulic fluid conduit means 37 (FIG. 2) in fluid communication with valve actuators 26 and 42, respectively, carried by the subsea equipment assembly 20 (FIG. 1).

Figure 3:
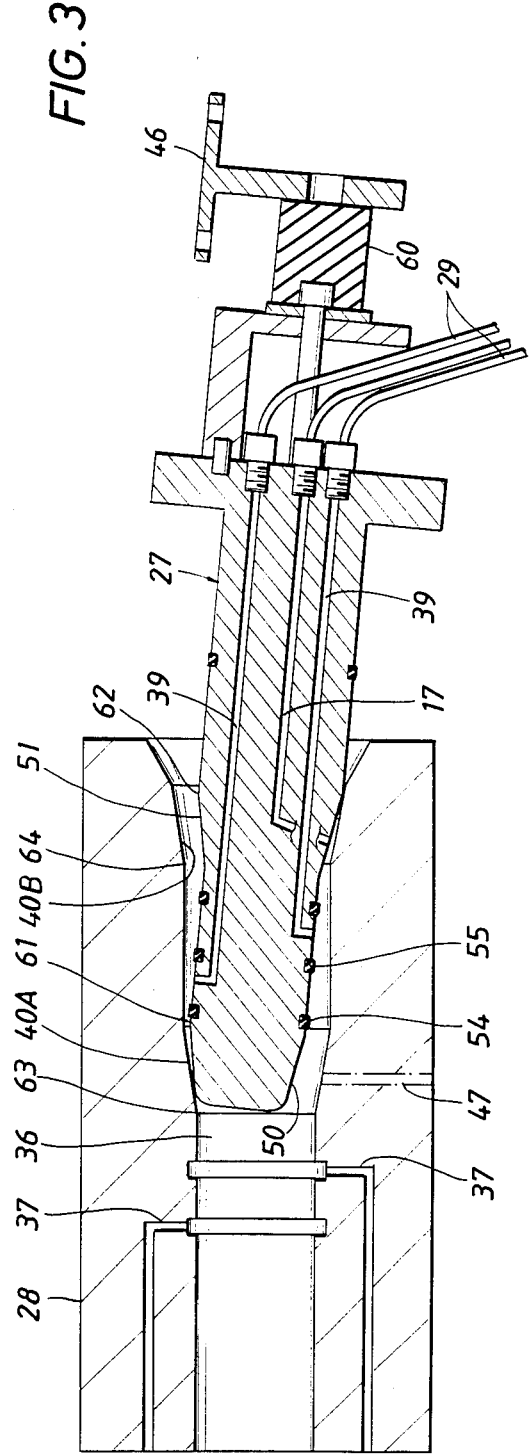

Additionally, the apparatus includes vacuum-locking means such as a hydraulically-actuatable suction lock assembly, selectively actuatable to lock or unlock the first probe 27 relative to the receptacle 28. In the configuration shown in FIGS. 2, 3 and 4, fluid trapped in the annular piston area, defined as the difference in cross-sectional area between the diameters of the probe at locations identified as 61 and 62, must be displaced either through line 47 (shown in phantom) to the sea or by pulling a vacuum through line 17 which permits the area to be used for vacuum lock. Use of the annular piston area for vacuum lock is another benefit of the dual tapered shoulder probe design. The invention permits the vacuum lock to be used even when the receptacle 28 is open ended as shown in these Figures.

Another preferred embodiment of the present invention (FIG. 5) illustrates a second probe body 52 at the closed-end of the receptacle 28 and extending into the chamber 36. The second probe body 52 preferably has a cone-shaped leading end with sloping guide surfaces, thereby constituting a second aligning means to facilitate final co-axial alignment of the second probe body 52 with the longitudinal axis of the first probe body 27. A recess 53 formed in the nose of the first probe 27 is of a size to operatively engage the second probe body 52.

First 54 and second 55 seal means are carried by the apparatus to engage the first probe 27 and the outer surface of the second probe 52. The first seal 54 and second seal 55 are positioned on opposite sides of the entrance of at least one of the hydraulic fluid conduit means 39. The second probe body 52 permits the o-ring sealing surfaces 54, 55 to be recessed internally to the probe 27 rather than being located on the outer surface of the first probe body 27 which is more easily subject to being damaged.

The second probe body 52 is hydraulically connectable in fluid communication with the hydraulic fluid conduit means 39 carried by at least a portion of the first probe body 27. Additionally, the apparatus includes vacuum-locking means 67 (FIG. 5), such as a hydraulically-actuatable suction assembly, selectively actuatable to lock or unlock the first probe 27 relative to the receptacle 28.

In operation, the probe 27 may be lowered down through the body of water 12 (FIG. 1) using an underwater vehicle 31 operatively engaged with the probe 27 via a manipulator arm 30 or by a diver (not shown). The probe 27 is subsequently centrally positioned within the receptacle 28. Due to the engagement of the shoulders 40A, 40B of the receptacle 28 with the first and second shoulders 50, 51 of the probe 27, as illustrated in sequential fashion by FIGS. 2, 3, and 4, the hydraulic fluid conduit means 39 of the probe 27 become operatively positioned adjacent the hydraulic fluid conduit means 37 located within the receptacle 28. At this point conduits 37 and 39 are in fluid communication and a pressure-tight seal has been established.

Finally, a supply of pressurized hydraulic fluid may be routed sequentially from a hydraulic cable 29, through the hydraulic fluid conduit 39 of the probe and conduit 37 of the receptacle 28 to the hydraulic actuator 26 of the hydraulically actuated valve 25 (FIG. 1).

The probe 27 may then be removed out of the receptacle 28 to another preferred location by actuating the vacuum-locking means 67 (FIG. 5) to unlock the probe 27 relative to the receptacle 28.

During normal operations of valve 25 (FIG. 1), pressurized hydraulic fluid is supplied from the pressurized fluid sources means 33 through the hydraulic fluid line 43 to the shuttle valve 15. The pressurized hydraulic fluid causes shuttle valve 15 to open, which supplies hydraulic fluid to the hydraulic valve actuator 26 of hydraulically-actuated valve 25. In this manner, the valve 25 may be actuated from a surface source of pressurized fluid 33.

Alternatively, valve 25 may be actuated by fluid supplied from the probe 27. In this manner, disabled hydraulic devices may be operated by use of the probe 27 even though the normal source of pressurized hydraulic fluid has been disabled due to accident or misuse.

In a like manner, the probe 27 may be used to selectively actuate valve equipment where it is desirable to use the probe 27 rather than the normal supply of pressurized fluid from the pressurized fluid source means 33 as previously described.

Thus, it can be seen that the primary objectives of this invention may be accomplished, based on the description of the preferred embodiment, by practicing the above-described method.

What is claimed is:

1. An apparatus for use in combination with a subsea equipment assembly located beneath the surface of a body of water having fluid conduit devices said apparatus comprising:
   receptacle means supported by said subsea equipment assembly having a chamber and fluid conduit means defined therein, and being in fluid communication with said devices,
   first probe body means having first and second shoulder means portions, said first shoulder means being formed at the end of the first probe body means entering said receptacle first and said second shoulder means axially displaced from said first shoulder means at a selected distance therefrom, said probe body means being enlarged in diameter at the top of said second shoulder means,
   fluid conduit means carried by at least a portion of said first probe body means for supplying fluid from a source means outside said first probe body means to said fluid conduit means carried by said receptacle,
   aligning means carried by said receptacle for positioning said first probe body means into said receptacle so that the longitudinal axis of said through-bore of said receptacle is aligned parallel to the longitudinal axis of said first probe body means in their operative position, wherein said aligning means includes two portions, the first portion of said receptacle causing coaxial alignment of said first probe body means, and a second portion at the entry-end of said receptacle, and
   holding means carried by said first probe body means at one end thereof and adapted to be engaged when inserting the other end of the first probe body means into said receptacle.

2. The apparatus of claim 1 including second probe body means hydraulically connectable in fluid communication with said fluid conduit means carried by at least a portion of said first probe body means.

3. The apparatus of claim 1 wherein said apparatus further includes a first seal and a second seal, both seals carried by said apparatus to engage said first probe body means and said receptacle in a fluid-tight manner, said first seal and said second seal being positioned on opposite sides of the entrance of at least one of said fluid conduit means.

4. The apparatus of claim 1 wherein said apparatus includes vacuum-locking means selectively actuatable to lock or unlock said first probe body means relative to said receptacle means.

5. The apparatus of claim 1 wherein the distance from the trailing end of the first shoulder means to the trailing end of the second shoulder means is substantially equal to the distance between the leading edge of the first portion of said aligning means and the leading end of the second portion of said aligning means.

6. The apparatus of claim 1 wherein said holding means includes at least a portion being flexible.

* * * * *